US010670085B2

(12) United States Patent
Saito et al.

(10) Patent No.: US 10,670,085 B2
(45) Date of Patent: Jun. 2, 2020

(54) AUTOMATIC CLUTCH DEVICE

(71) Applicant: NTN CORPORATION, Osaka (JP)

(72) Inventors: Takahide Saito, Shizuoka (JP); Koji Sato, Shizuoka (JP); Masahiro Kawai, Shizuoka (JP); Atsushi Ikeda, Shizuoka (JP)

(73) Assignee: NTN CORPORATION, Osaka (JP)

( * ) Notice: Subject to any disclaimer, the term of this patent is extended or adjusted under 35 U.S.C. 154(b) by 241 days.

(21) Appl. No.: 15/752,721

(22) PCT Filed: Aug. 23, 2016

(86) PCT No.: PCT/JP2016/074541
§ 371 (c)(1),
(2) Date: Feb. 14, 2018

(87) PCT Pub. No.: WO2017/033940
PCT Pub. Date: Mar. 2, 2017

(65) Prior Publication Data
US 2018/0238402 A1  Aug. 23, 2018

(30) Foreign Application Priority Data

Aug. 25, 2015 (JP) .................................. 2015-165678

(51) Int. Cl.
*F16D 23/12* (2006.01)
*F16D 23/14* (2006.01)
(Continued)

(52) U.S. Cl.
CPC ............. *F16D 23/12* (2013.01); *F16D 13/40* (2013.01); *F16D 23/14* (2013.01); *F16D 28/00* (2013.01);
(Continued)

(58) Field of Classification Search
CPC .......... F16D 23/12; F16D 23/14; F16D 13/40; F16D 28/00; F16D 2013/565; F16D 2023/123; F16H 25/125; F16H 1/16
See application file for complete search history.

(56) References Cited

U.S. PATENT DOCUMENTS 4,626,696 A * 12/1986 Maucher .................. B60K 6/48
290/38 R
4,936,428 A *  6/1990 Leigh-Monstevens .....................
F16D 28/00
192/111.16
(Continued)

FOREIGN PATENT DOCUMENTS

EP  0 992 700  4/2000
JP  62-167931  7/1987
(Continued)

OTHER PUBLICATIONS

International Preliminary Report on Patentability dated Feb. 27, 2018 in International (PCT) Application No. PCT/JP2016/074541.
(Continued)

*Primary Examiner* — Jacob S. Scott
*Assistant Examiner* — Lillian T Nguyen
(74) *Attorney, Agent, or Firm* — Wenderoth, Lind & Ponack, L.L.P.

(57) ABSTRACT

An automatic clutch device includes an axial force generating mechanism including an electric motor arranged adjacent to the outer periphery of an end of an input shaft of a transmission, and a rotation-linear motion conversion mechanism for converting the rotation of the rotor of the electric motor to a linear motion of a release bearing. The rotation-linear motion conversion mechanism includes plural annular cam plates arranged in tandem on the input shaft, and torque cam mechanisms each disposed between each
(Continued)

opposed pair of cam plates, for reduced size and improved responsiveness of the automatic clutch device.

13 Claims, 11 Drawing Sheets

(51) Int. Cl.
  *F16D 13/40* (2006.01)
  *F16H 25/12* (2006.01)
  *F16D 13/56* (2006.01)
  *F16D 28/00* (2006.01)
  *F16H 1/16* (2006.01)

(52) U.S. Cl.
  CPC ..... *F16H 25/125* (2013.01); *F16D 2013/565* (2013.01); *F16D 2023/123* (2013.01); *F16H 1/16* (2013.01)

(56) References Cited

U.S. PATENT DOCUMENTS

| | | |
|---|---|---|
| 5,485,904 A | 1/1996 | Organek et al. |
| 6,561,336 B1 * | 5/2003 | Huart .............. F02B 63/04 192/70.252 |
| 2004/0188216 A1 | 9/2004 | Yamazaki |
| 2016/0040731 A1 | 2/2016 | Fukunaga et al. |
| 2016/0040732 A1 | 2/2016 | Fukunaga et al. |

FOREIGN PATENT DOCUMENTS

| | | |
|---|---|---|
| JP | 2003-097597 | 4/2003 |
| JP | 2004-044520 | 2/2004 |
| JP | 2004-308900 | 11/2004 |
| JP | 2007-051664 | 3/2007 |
| JP | 2010-078156 | 4/2010 |
| JP | 2014-202238 | 10/2014 |

OTHER PUBLICATIONS

International Search Report dated Nov. 29, 2016 in International (PCT) Application No. PCT/JP2016/074541.

* cited by examiner

AUTOMATIC CLUTCH DEVICE

TECHNICAL FIELD

The present invention relates to an automatic clutch device for selectively transmitting and not transmitting the power from an engine crankshaft to the input shaft of the transmission.

BACKGROUND ART

JP Patent Publication 2010-78156A (hereinafter JP '156) and JP Patent Publication 2014-202238A (hereinafter JP '238) disclose known automatic clutch devices for automatically engaging and disengaging manual transmissions (MT) and automated manual transmissions (AMT).

The automatic clutch device disclosed in JP '156 is configured such that when the clutch pedal is depressed, hydraulic pressure is generated in a master cylinder mechanically connected to the clutch pedal, and is supplied to a clutch release cylinder. The clutch release cylinder pivots a release fork, thereby pressing a release bearing, a pressure plate is pressed against a flywheel under the pressing force applied to the pressure plate from the release bearing, and the clutch device engages.

The automatic clutch device disclosed in JP '238 is configured, similar to the clutch device of JP '156, such that hydraulic pressure generated in the master cylinder by depressing the clutch pedal is supplied to a clutch release cylinder, the clutch release cylinder pivots a release fork, the release fork presses a release bearing, and the clutch device disengages.

Patent Document 1: JP Patent Publication 2010-78156A
Patent Document 2: JP Patent Publication 2014-202238A Since the clutch device of either of JP '156 and JP '238 is configured to be engaged and disengaged by pivoting the release fork with the clutch release cylinder, such clutch devices tend to be large in size. Moreover, since such clutch devices require a hydraulic pump, and pipe connections between the hydraulic pump and the clutch release cylinder, a large installation space is needed for such clutch devices.

SUMMARY OF THE INVENTION

While the ambient temperature is low, hydraulic pressure used to activate the clutch release cylinder flows less smoothly in the pipes due to elevated viscosity of the hydraulic oil, thus deteriorating responsiveness of the clutch release cylinder.

An object of the present invention is to reduce the size, and improve responsiveness, of an automatic clutch device of the type that selectively transmits power from the engine to the input shaft of the transmission by applying a pushing force to the release bearing.

Means for Achieving the Object

In order to achieve this object, the present invention provides an automatic clutch device comprising: a flywheel attached to an end of a crankshaft of an engine; a clutch disk provided at an end of an input shaft of a transmission, and opposed to the flywheel; a pressure plate configured to bias the clutch disk toward the flywheel; a release bearing configured to be movable toward and away from the pressure plate; and an axial force generating mechanism configured to press and move the release bearing toward the pressure plate. The automatic clutch device is configured such that when the pressure plate is pressed by the release bearing, the flywheel and the clutch disk are uncoupled from each other. The axial force generating mechanism includes: an electric motor having a rotor; a rotation-linear motion conversion mechanism configured to convert rotation of the rotor of the electric motor to a linear motion of the release bearing, the rotation-linear motion conversion mechanism having a first end and a second end, and including at least two annular cam plates arranged in tandem with each other on the input shaft, and opposed to each other; and a torque cam mechanism provided between the two opposed cam plates, and configured to convert relative rotation between the two opposed cam plates to a relative axial linear motion therebetween, wherein a first one of the at least two cam plates remotest from the release bearing and at the first end is an input-side cam plate configured to be driven by the electric motor, and a second one of the at least two cam plates at the second end is an output-side cam plate, and wherein a reverse input blocking mechanism is mounted in a torque transmission path extending from the electric motor to the output-side cam plate, and configured to block reverse input from the release bearing.

With this automatic clutch device, while the electric motor is not activated, the clutch disk is pressed against the flywheel under the biasing force of the pressure plate, and the clutch device is engaged, so that the rotation of the crankshaft of the engine is transmitted to the input shaft of the transmission.

When the electric motor is activated, the rotation of the rotor of the electric motor is transmitted to the input-side cam plate of the rotation-linear motion conversion mechanism, and the input-side cam plate rotates.

The rotation of the input-side cam plate is converted to an axial linear motion of the output-side cam plate by the torque cam mechanism between the at least two opposed cam plates, and the output-side cam plate presses the release bearing.

Pressed by the output-side cam plate, the release bearing is moved axially and presses the pressure plate. This causes the pressure plate to be elastically deformed such that the clutch disk is not pressed by the pressure plate. As a result, the clutch disk is moved to a position where it does not press the fly wheel, so that the clutch device disengages, and cuts the transmission of power from the crankshaft to the input shaft.

Thus, by turning on and off the electric motor, the clutch device can be selectively engaged and disengaged, and the power from the crankshaft can be selectively transmitted, and not transmitted, to the input shaft.

Since the rotation-linear motion conversion mechanism for converting the rotation of the rotor of the electric motor to linear motion comprises at least two opposed cam plates, and a torque cam mechanism disposed between the opposed cam plates, and the cam plates are arranged in tandem with each other on the input shaft, the electric motor can be arranged at a position around the cam plates. Thus, the automatic clutch device is compact in size. Since an electric motor is used as the power source, the automatic clutch device can be mounted in position simply by suitably arranging wires, so that no large installation space is required for the clutch device.

Since an electric motor can be quickly activated without being influenced by changes in the surrounding environment such as a change in temperature, the automatic clutch device according to the present invention is sufficiently responsive.

The torque cam mechanism, which is disposed between the two opposed cam plates, may comprise a plurality of ball cams circumferentially spaced apart from each other, and each comprising an opposed pair of cam grooves, and a ball received between the cam grooves, or comprise face cams circumferentially spaced apart from each other, and each comprising a V-shaped cam groove formed in one of the two opposed cam plates, and a V-shaped cam protrusion formed on the other of the two opposed cam plates.

If the ball cams are used, a retainer is preferably mounted between the two opposed cam plates to retain the balls of the ball cams with the retainer. By retaining the balls with the retainer, since the retainer allow the balls to be moved simultaneously in the circumferential direction by the same distance, the balls can be brought into contact with the respective cam grooves at equal surface pressures. This prevents deformation of, and damage to, the cam grooves and the balls.

If the ball cams are used, the reverse input blocking mechanism may include pairs of shallow grooves, each of the shallow grooves having a constant depth over an entire circumferential length thereof, and each pair of the shallow grooves being provided, respectively, at one circumferential end of one of the corresponding opposed pair of cam grooves and at the opposite circumferential end of the other of the corresponding opposed pair of cam grooves, such that when the two opposed cam plates rotate relative to each other, each of the balls is fitted and trapped between the corresponding pair of shallow grooves, thereby blocking reverse input from the release bearing.

The rotor of the electric motor may be a solid shaft, or the electric motor may be a hollow motor, i.e., a motor having a cylindrical rotor. If an electric motor having a rotor comprising a solid shaft is used, the electric motor may be arranged perpendicular to the input shaft, or arranged parallel to the input shaft.

If the electric motor is arranged perpendicular to the input shaft, the rotation of the rotor is transmitted to the input-side cam plate through a worm and a worm wheel. The worm and the worm wheel serve, besides as a rotation transmission mechanism, as a reverse input blocking mechanism for blocking reverse input from the release bearing.

If the electric motor is arranged parallel to the input shaft, the rotation of the electric motor is transmitted to the input-side cam plate through a pair of spur gears that mesh with each other. In this case, a reverse input blocking clutch may be mounted between the gear shaft of the input-side spur gear and the rotor of the electric motor to block reverse input from the gear shaft.

If a hollow motor is used, the hollow motor is fitted to the input-side cam plate such that the rotation of the hollow motor is directly transmitted to the input-side cam plate. The use of a hollow motor makes it possible to further reduce the size of the automatic clutch device.

The output-side cam plate may be arranged axially opposed to the release bearing, or may be fixedly fitted to the release bearing. By fixedly fitting the output-side cam plate on the radially outer surface of the release bearing, it is possible to reduce the axial length of the automatic clutch device.

Advantages of the Invention

According to the present invention, as described above, since the rotation of the electric motor is converted to a linear motion of the release bearing by a rotation-linear motion conversion mechanism comprising at least two cam plates arranged in tandem with each other on the input shaft, and a torque cam mechanism, thereby pressing the pressure plate, compared to a conventional automatic clutch device in which the release fork is pivoted by the clutch release cylinder to move the release bearing toward the pressure plate, the automatic clutch device according to the present invention is compact in size, and does not require a large installation space.

Since the electric motor as the driving source is activated and deactivated by operating a switch, and its operation is not influenced by changes in the surrounding environment such as a change in temperature, the automatic clutch device according to the present invention is sufficiently responsive.

The reverse input blocking mechanism, which is provided in the torque transmission path from the electric motor to the output-side cam plate for pressing the release bearing, makes it possible to reliably keep the automatic clutch device disengaged.

DETAILED DESCRIPTION OF THE INVENTION

Figure 1:
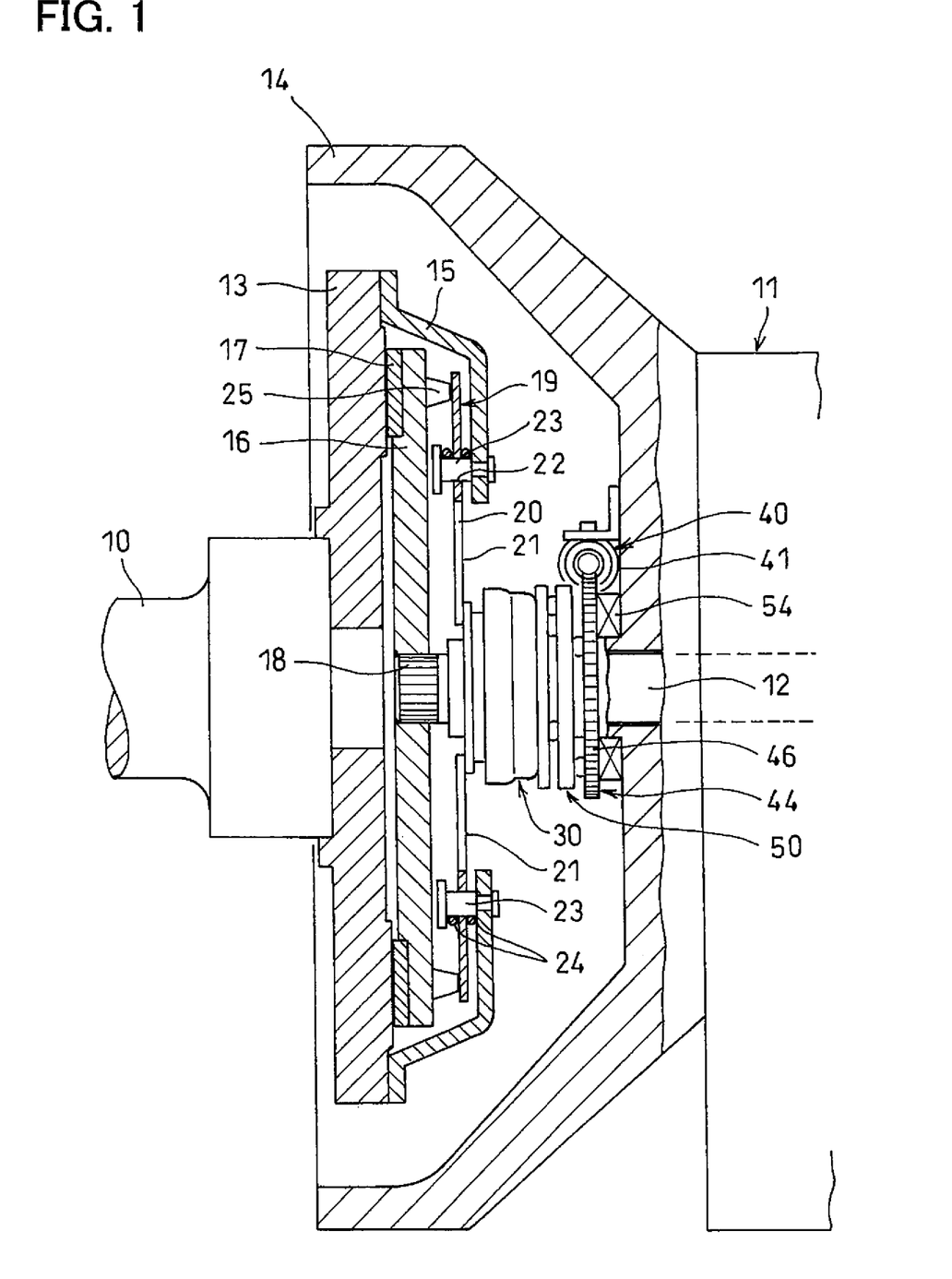
FIG. 1 is a sectional view of an embodiment of an automatic clutch device according to the present invention.

Embodiments of the present invention are now described with reference to the drawings. FIG. 1 shows an input shaft 12 of a transmission 11 including gears mounted on parallel shafts, the input shaft 12 being arranged coaxial with a crankshaft 10 of an engine.

A flywheel 13 is fixed to the end of the crankshaft 10 opposed to the input shaft 12, and is located inside of, so as to be rotatable relative to, a clutch housing 14 of the transmission 11.

A clutch cover 15 is mounted to the outer peripheral portion of the outer side surface of the flywheel 13 that is opposed to the transmission 11. A clutch disk 16 is mounted in the clutch cover 15.

A facing 17 is fixed to the outer peripheral portion of the outer side surface of the clutch disk 16 that is opposed to the flywheel 13. The clutch disk 16 is fitted to serrations 18 formed on the outer periphery of the end of the input shaft 12 so as to be rotationally fixed and axially slidable, relative to the input shaft 12.

A pressure plate 19 is mounted inside of the clutch cover 15. The pressure plate 19 comprises a diaphragm spring. The diaphragm spring 19 is an annular member formed with radially extending slots 20 at its inner peripheral portion, and includes a spring piece 21 formed between each adjacent pair of the slots 20.

The diaphragm spring 19 further includes circumferentially equidistantly spaced apart pin holes 22 at its portion between the circle passing through the closed ends of the slots 20 and the radially outer surface of the diaphragm spring 19. Support pins 23 are mounted to the clutch cover 15, and each loosely inserted in one of the pin holes 22.

A pair of rings 24 are wrapped around the support pins 23 on the respective sides of the diaphragm spring 19 such that the diaphragm spring 19 is supported by the pair of rings 24 and the support pins 23.

The diaphragm spring 19 presses protrusions 25 on the outer peripheral portion of the clutch disk 16 toward the flywheel 13, thereby pressing the facing 17 against the flywheel 13. When the inner peripheral portion of the diaphragm spring 19 is pressed toward the flywheel 13, the facing 17 is no longer pressed against the flywheel 13, that is, the clutch disengages.

Figure 2:
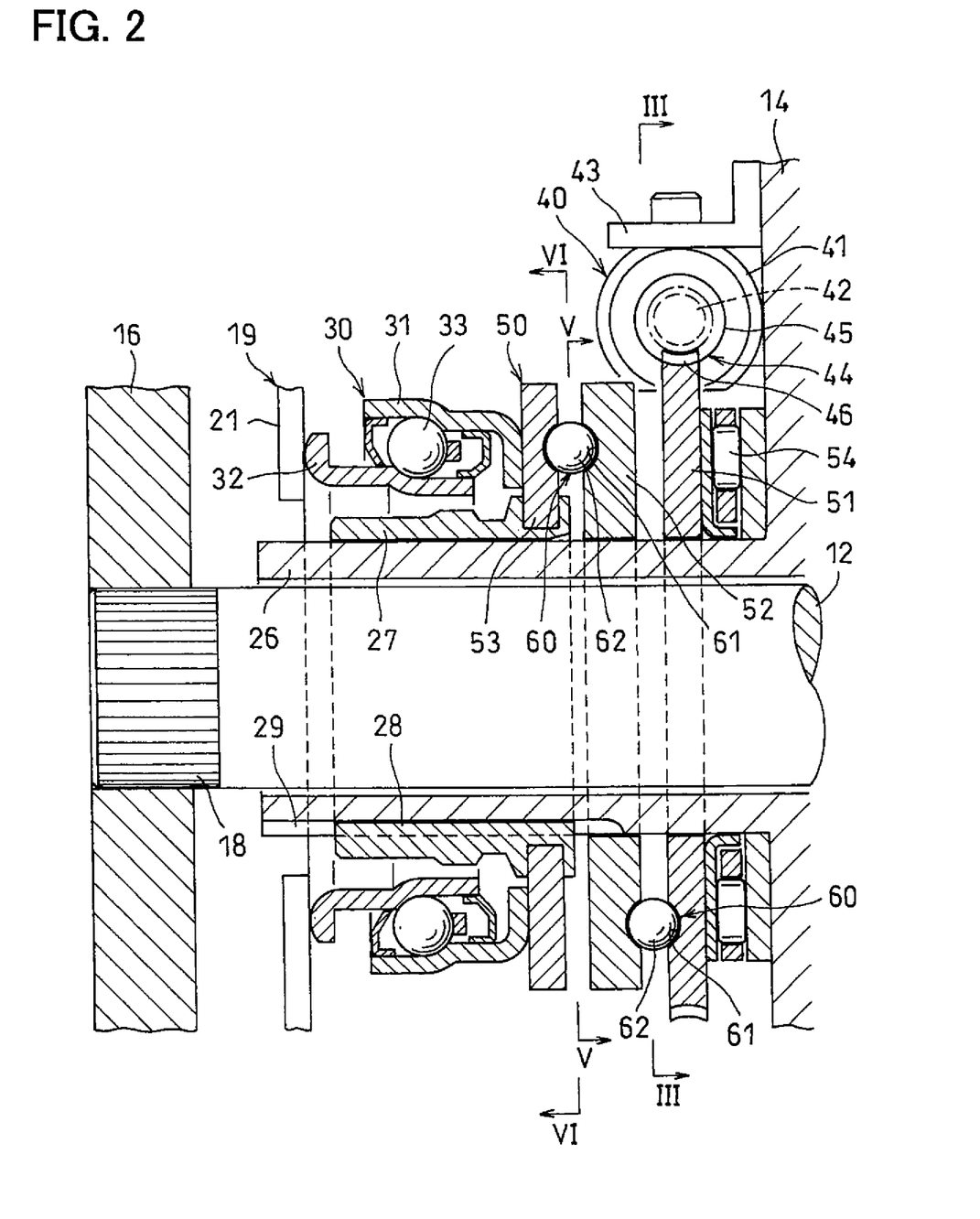
FIG. 2 shows, in enlarged section, a release bearing of FIG. 1.

As shown in FIG. 2, the clutch housing 14 includes a guide tube 26 covering the input shaft 12. A sleeve 27 is fitted on the guide tube 26. The sleeve 27 has, on the inner periphery thereof, keys 28 fitted in key grooves 29 formed in the outer periphery of the guide tube 26 so that the sleeve 27 is non-rotatably but slidably supported by the guide tube 26.

A release bearing 30 surrounds the sleeve 27. The release bearing 30 includes an outer race 31, an inner race 32, and balls 33. The inner race 32 is connected to the inner peripheral portion of the diaphragm spring 19.

The release bearing 30 is pressed toward the diaphragm spring 19 by an axial force generating mechanism 40 surrounding the guide tube 26.

The axial force generating mechanism 40 includes an electric motor 41, and a rotation-linear motion conversion mechanism 50 configured to convert the rotation of the rotor 42 of the electric motor 41 to a linear motion of the release bearing 30.

Figure 3:
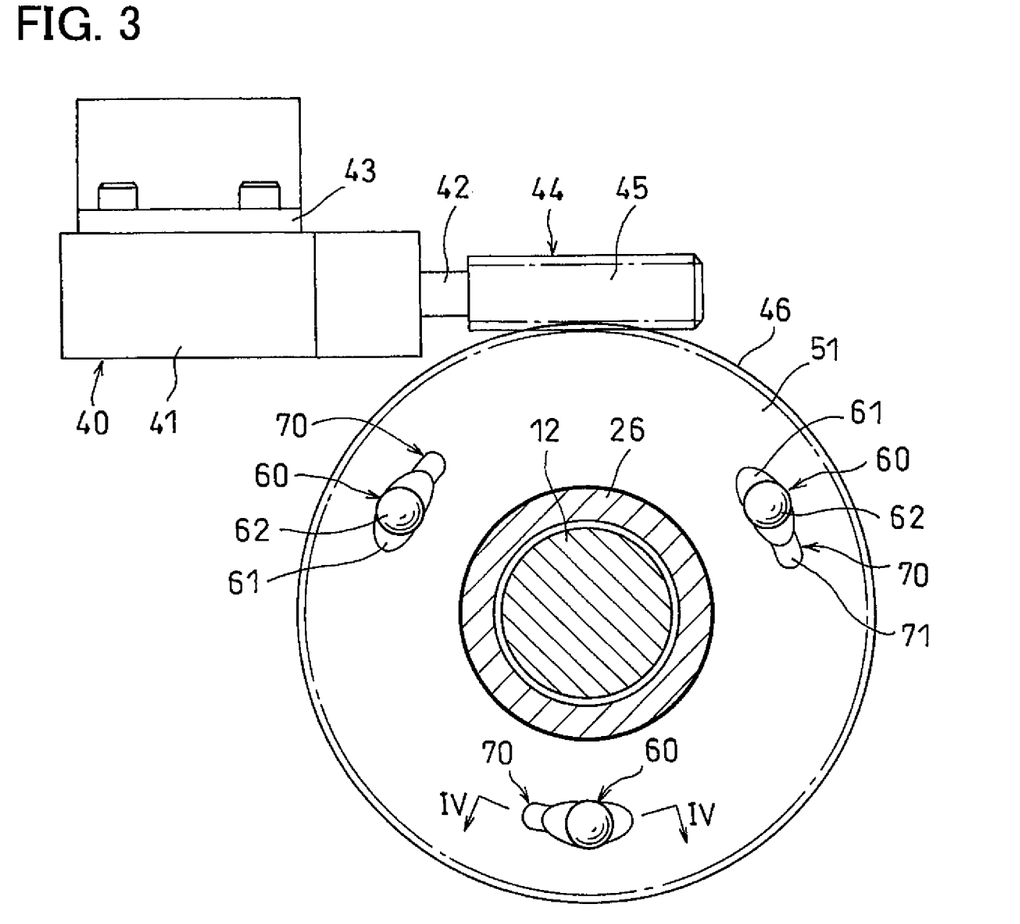
FIG. 3 is a sectional view taken along line of FIG. 2.

As shown in FIG. 3, the electric motor 41 includes a rotor 42 comprising a solid shaft. As shown in FIGS. 2 and 3, the electric motor 41 extends perpendicular to the input shaft 12, and the rotation of the rotor 42 of the electric motor 41 is transmitted to the rotation-linear motion conversion mechanism 50 through a rotation transmission mechanism 44 comprising a worm 45 and a worm wheel 46.

As shown in FIGS. 2-6, the rotation-linear motion conversion mechanism 50 includes three annular cam plates 51, 52 and 53 arranged in tandem with each other on the guide tube 26. Torque cam mechanisms 60 are disposed between each opposed pair of the cam plates.

The three cam plates 51-53 are, from the end plate of the clutch housing 14 toward the release bearing 30, an input-side cam plate 51, intermediate cam plate 52, and output-side cam plate 53. The input-side cam plate 51 has an outer peripheral portion including an integral worm wheel 46 with which the worm 45 meshes so that the rotation of the rotor 42 of the electric motor 41 is transmitted to the input-side cam plate 51.

A thrust bearing 54 is mounted between the input-side cam plate 51 and the end plate of the clutch housing 14, and allows the input-side cam plate 51 to rotate while being axially stationary.

The intermediate cam plate 52 is rotatable about the guide tube 26, and axially movable. The output-side cam plate 53 is connected to the sleeve 27 and the release bearing 30 so as to be non-rotatable and axially movable.

Figure 4A:
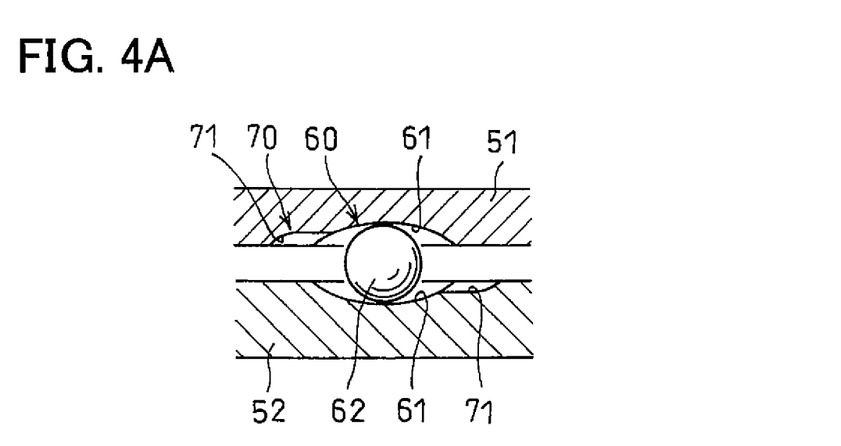
FIG. 4A is a sectional view taken along line IV-IV of FIG. 3.

Referring to FIG. 4A, each torque cam mechanism 60 comprises a ball cam composed of an opposed pair of cam grooves 61 which are the deepest at the circumferential center thereof, and gradually shallow toward the respective circumferential ends, and a ball 62 received between the pair of cam grooves 61.

While three cam plates are used in the embodiment, two or more than three cam plates may be used instead. While, in the embodiment, three ball cams 60 are arranged between each opposed pair of the cam plates at circumferentially equal intervals, more than three ball cams may be used instead.

Figure 4B:
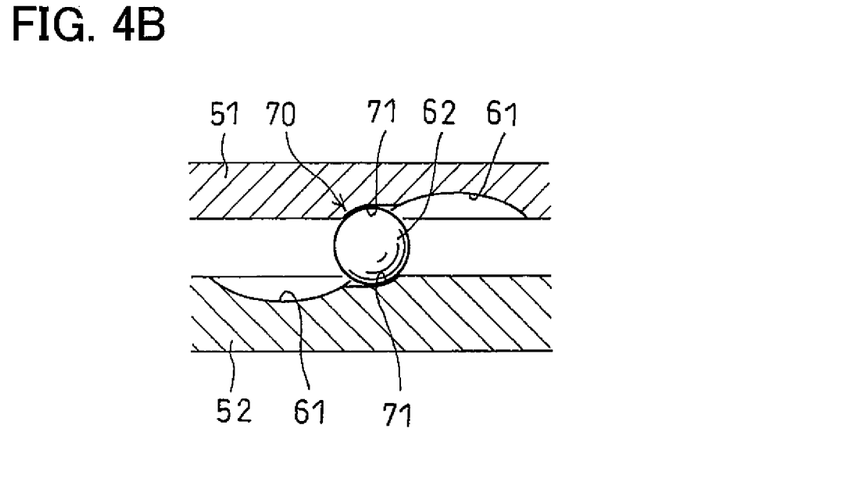
FIG. 4B shows in section how a ball cam operates.
Figure 5:
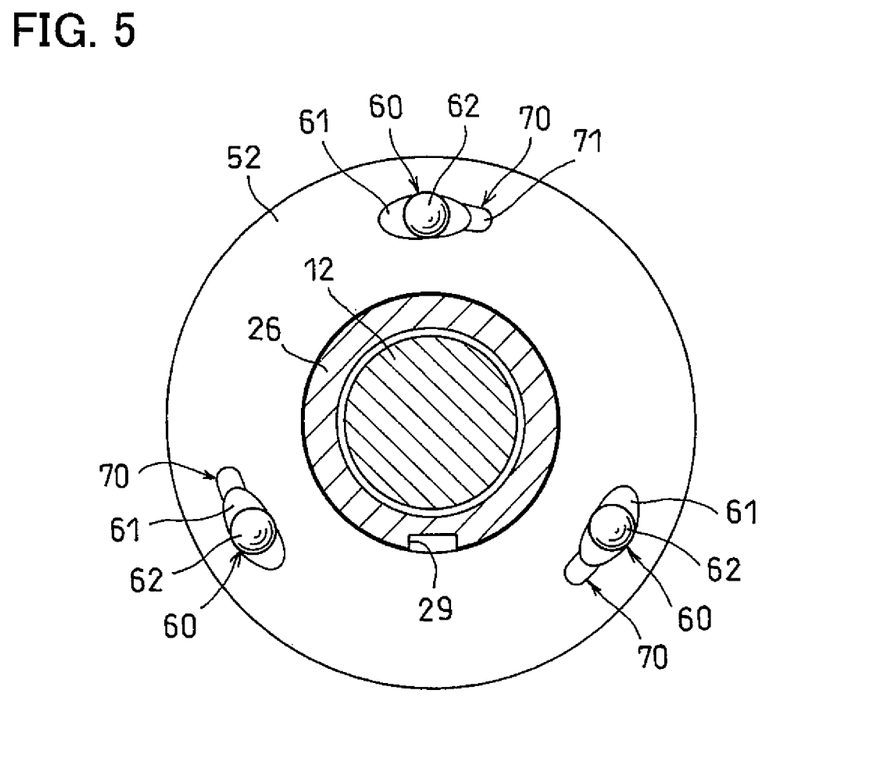
FIG. 5 is a sectional view taken along line V-V of FIG. 2.
Figure 6:
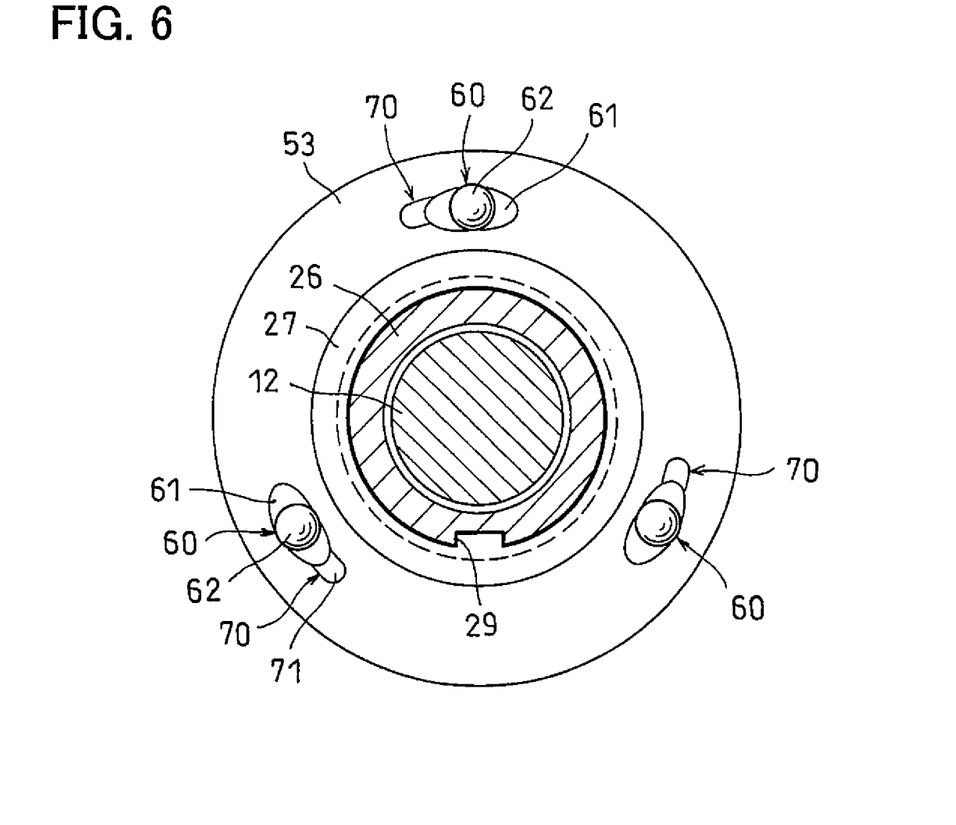
FIG. 6 is a sectional view taken along line VI-VI of FIG. 2.

Referring to FIGS. 3, 4A and 4B, the ball cams 60 are provided with a reverse input blocking mechanism 70. The reverse input blocking mechanism 70 is configured to prevent the actuation of the rotation-linear motion conversion mechanism 50 under the reaction force from the diaphragm spring 19.

In the embodiment, the reverse input blocking mechanism 70 includes pairs of shallow grooves 71, each pair being provided at one circumferential end of one of the corresponding opposed pair of cam grooves 61 and the opposite circumferential end of the other of the pair of cam grooves 61, each shallow groove 71 having a constant depth over the entire circumferential length thereof. The reverse input blocking mechanism 70 is thus configured such that when either of the opposed pairs of cam grooves rotate relative to each other, each ball 62 is, as shown in FIG. 4B, fitted and trapped between the shallow grooves 71, thereby preventing generation of a rotational component of a force, and blocking reverse input.

FIG. 1 shows this automatic clutch device when the clutch disk 16 is pressed against the flywheel 13 by the diaphragm spring 19, and thus the clutch device is engaged. In this state, when the crankshaft 10 rotates, its rotation is transmitted to the input shaft 12 such that the input shaft 12 rotates in the same direction as the crankshaft 10.

While the clutch device is engaged, the ball 62 of each of the ball cams 60 disposed (as shown in FIG. 2) between the input-side cam plate 51 and the intermediate cam plate 52 and between the intermediate cam plate 52 and the output-side cam plate 53 is located, as shown in FIG. 4A, between the deepest portions of the opposed pair of cam grooves 61, so that the distances between the input-side cam plate 51 and the intermediate cam plate 52, and between the intermediate cam plate 52 and the output-side cam plate 53 are the shortest.

With the clutch device engaged as shown in FIG. 1, when the electric motor 41, shown in FIGS. 2 and 3, is activated and its rotor 42 is rotated, the rotation of the rotor 42 is transmitted to the input-side cam plate 51 through the worm 45 and the worm wheel 46, so that the input-side cam plate 51 rotates while being axially stationary.

When the input-side cam plate 51 rotates, due to the action of the ball cams 60 disposed between the input-side cam plate 51 and the intermediate cam plate 52, the intermediate cam plate 52 moves axially while rotating, until, as shown in FIG. 4B, each ball 62 is fitted and trapped between the corresponding opposed pair of the shallow grooves 71.

Since ball cams 60 are also disposed between the intermediate cam plate 52 and the output-side cam plate 53, and the output-side cam plate 53 is axially slidable but non-rotatable, the rotation of the intermediate cam plate 52 causes the output-side cam plate 53 to move axially, thus pressing the release bearing 30. As a result, the release bearing 30 moves axially, and presses the inner peripheral portion of the diaphragm spring 19 toward the clutch disk 16. This moves the diaphragm spring 19 to a position where it is not pressed against the clutch disk 16, so that the clutch device disengages, thus prohibiting transmission of power from the crankshaft 10, shown in FIG. 1, to the input shaft 12.

When the intermediate cam plate 52 rotates relative to the output-side cam plate 53, each of the balls 62 of the ball cams 60 therebetween is, in the same manner as shown in FIG. 4B, fitted and trapped between the corresponding opposed pair of the shallow grooves 71. Thus, due to the abutment of the balls 62 against the respective pairs of shallow grooves 71, reverse input from the release bearing 30 is blocked, so that the automatic clutch device remains disengaged.

In the embodiment shown in FIGS. 1-6, the rotation of the electric motor 41 is converted to a linear motion of the release bearing 30 by the rotation-linear motion conversion mechanism 50 comprising the plurality of cam plates 51-53 and the ball cams 60, to press the diaphragm spring 19 with the release bearing 30, thereby disengaging the clutch device. The cam plates 51-53, which form the rotation-linear motion conversion mechanism 50, are arranged in tandem with each other on the input shaft 12. This arrangement realizes a small automatic clutch device. Since the power source of this clutch device is an electric motor, the clutch device can be mounted in position simply by properly arranging wires, so that it does not require a large installation space.

Since the electric motor 41 can be quickly activated without being influenced by changes in the surrounding environment such as a change in temperature, the automatic clutch device according to the present invention is sufficiently responsive.

Figure 7A:
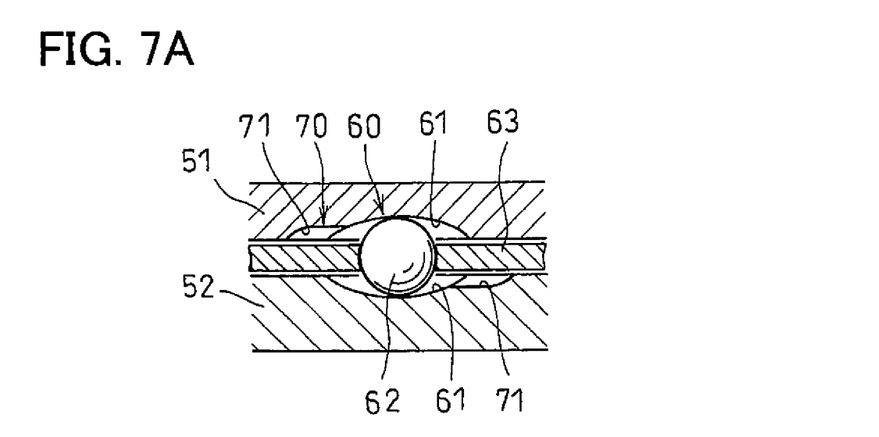
FIG. 7A is a sectional view of a ball cam with a retainer.
Figure 7B:
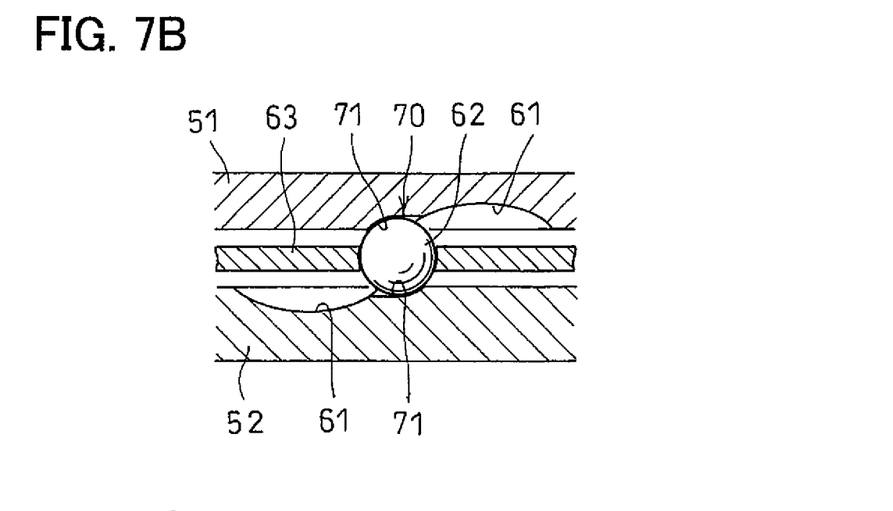
FIG. 7B illustrates an operational state of the ball cam of FIG. 7A.

In another arrangement, a retainer 63 is, as shown in FIGS. 7A and 7B, mounted between the input-side cam plate 51 and the intermediate cam plate 52, and while not shown, another retainer is mounted between the intermediate cam plate 52 and the output-side cam plate 53, to retain the balls 62 of the ball cams 60 with the retainers. With this arrangement, since the retainers allow the corresponding balls 62 to be moved simultaneously in the circumferential direction by the same distance, the balls 62 can be brought into contact with the respective cam grooves 61 at equal surface pressures. This prevents deformation of, and damage to, the cam grooves 61 and the balls 62.

While FIGS. 4A and 4B show a ball cam as a torque cam mechanism 60 disposed between each opposed pair of cam plates, the torque cam mechanisms 60 are not limited to ball cams. For example, FIGS. 8A and 8B show a face cam, as a torque cam mechanism 60, which is constituted by V-shaped cam groove 64 formed in the input-side cam plate 51, and a V-shaped cam protrusion 65 formed on the intermediate cam plate 52.

Figure 8A:
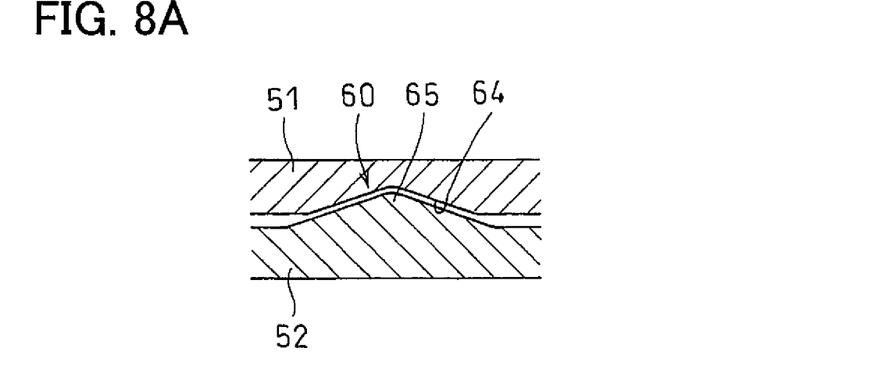
FIG. 8A is a sectional view of another example of a torque cam mechanism.
Figure 8B:
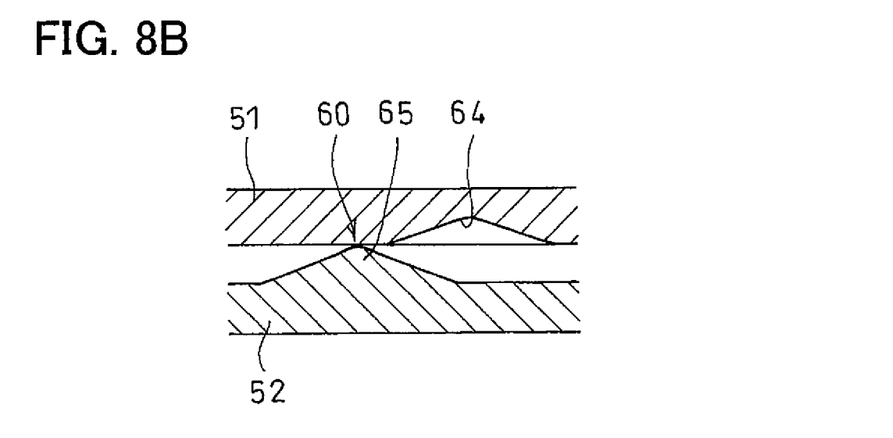
FIG. 8B illustrates an operational state of the torque cam mechanism of FIG. 8A.

While FIGS. 8A and 8B show a face cam constituted by a V-shaped cam groove 64 formed in the input-side cam plate 51, and a V-shaped cam protrusion 65 formed on the intermediate cam plate 52, a face cam may be used which is constituted by a V-shaped cam protrusion formed on the input-side cam plate, and a V-shaped cam groove formed in the intermediate cam plate 52.

Figure 9A:
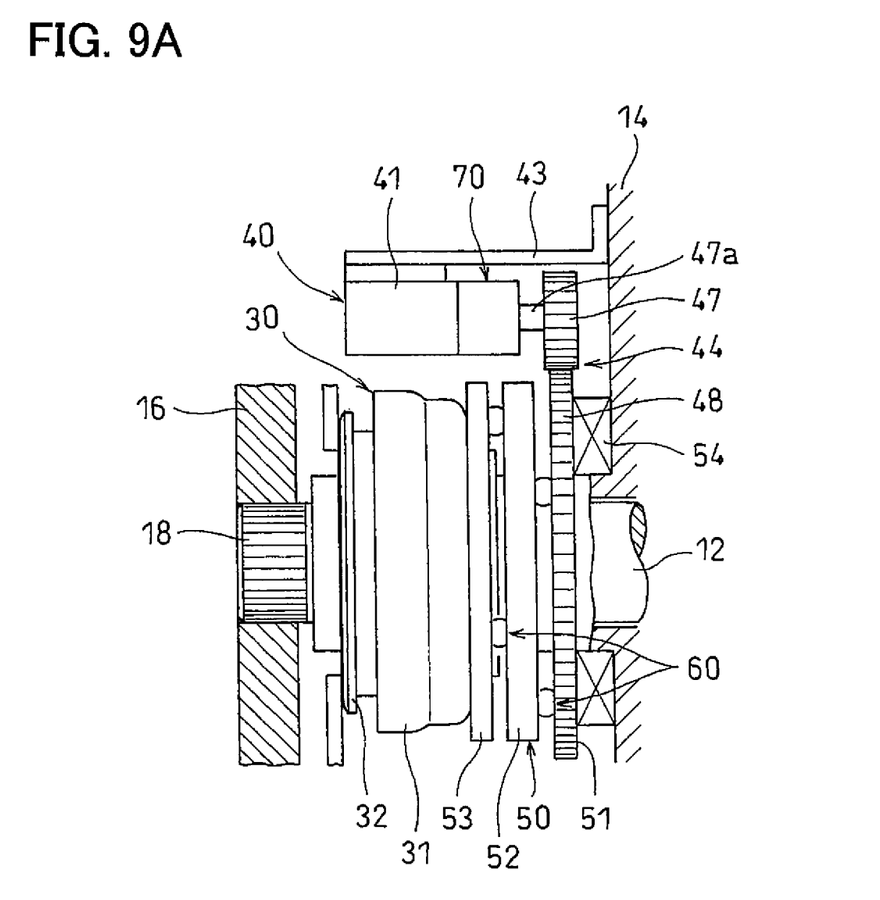
FIG. 9A is a sectional view of another embodiment of an automatic clutch device according to the present invention.

While in FIG. 3, the electric motor 41 extends perpendicular to the input shaft 12, the electric motor 41 may be arranged, as shown in FIG. 9A, parallel to the input shaft 12. In the latter case, the rotation of the electric motor 41 is transmitted to the input-side cam plate 51 of the rotation-linear motion conversion mechanism 50 through spur gears 47 and 48 meshing with each other.

The automatic clutch device shown in FIG. 9A includes a reverse input blocking clutch, as the reverse input blocking mechanism 70, between the rotor 42 of the electric motor 41 and the gear shaft 47a of the spur gear 47 to block reverse input from the release bearing 30.

Figure 10A:
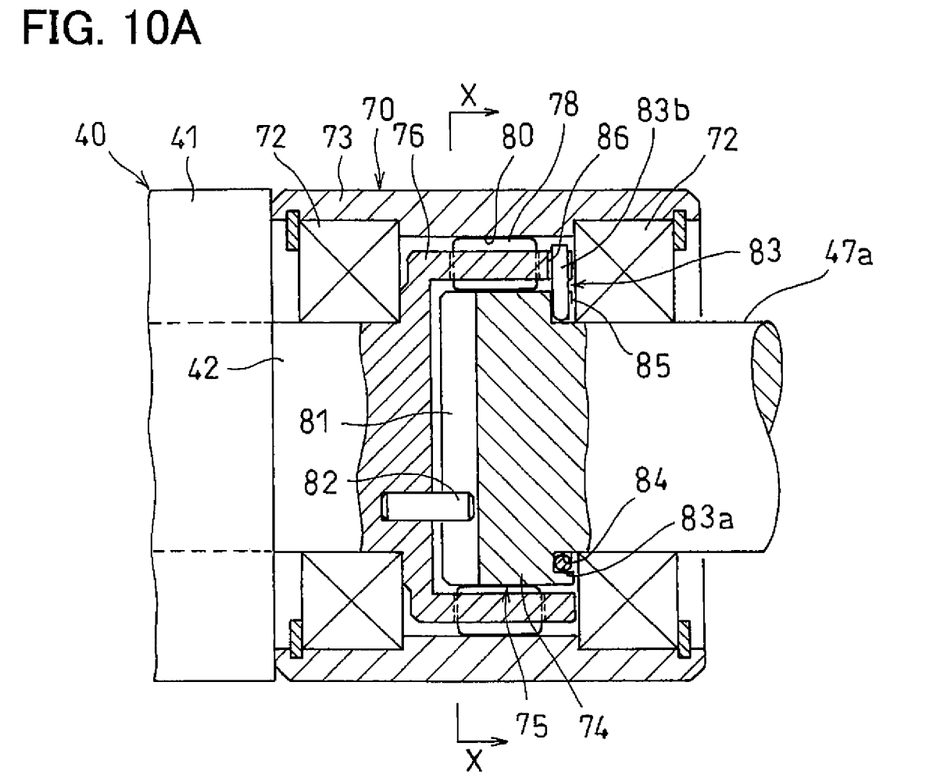
FIG. 10A shows in section another example of a reverse input blocking mechanism.
Figure 10B:
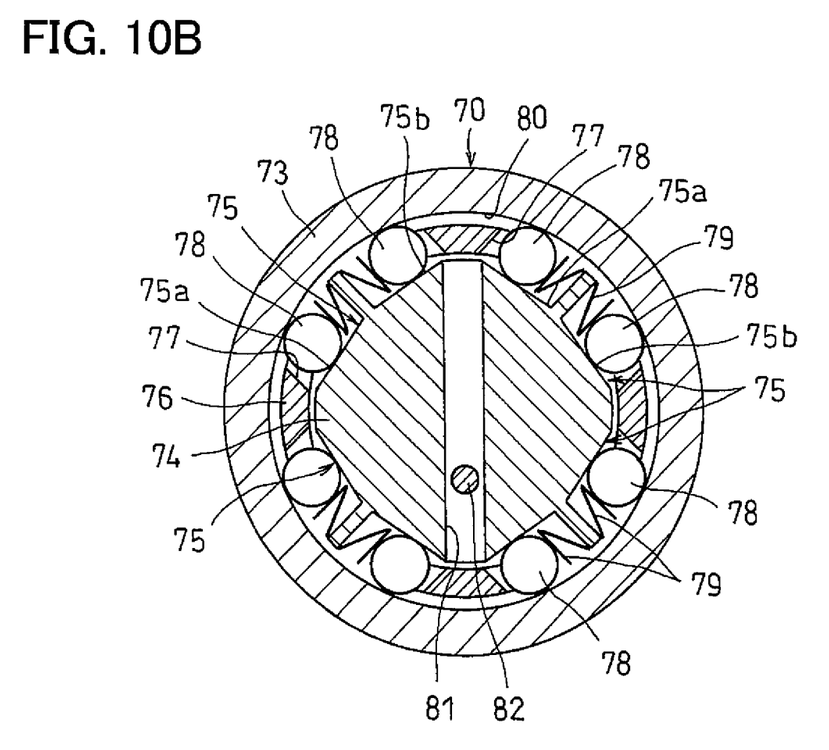
FIG. 10B is a sectional view taken along line X-X of FIG. 10A.

Referring to FIGS. 10A and 10B, the reverse input blocking clutch 70 includes a cylindrical clutch outer ring 73 supported by bearings 72 fitted, respectively, to the rotor 42 of the electric motor 41 and the gear shaft 47a such that the clutch outer ring 73 is rotatable relative to the rotor 42 and the gear shaft 47a. The clutch 70 further includes a clutch inner ring 74 provided on the gear shaft 47a and located inside of the clutch outer ring 73 so as to be rotatable relative to the clutch outer ring 73. The clutch inner ring 74 has an outer periphery formed with a plurality of cam surfaces 75 spaced apart from each other in the circumferential direction and each including a pair of inclined surface portions 75a and 75b that are inclined in opposite directions to each other.

A retainer 76 is provided at the end of the rotor 42 of the electric motor 41 such that the retainer 76 is located between, and rotatable relative to, the clutch outer ring 73 and the clutch inner ring 74. The retainer 76 has pockets 77 each facing the corresponding one of the cam surfaces 75 of the clutch inner ring 74. A pair of rollers 78 and an elastic member 79 are received in each pocket 77 such that the elastic member 79 is disposed between the pair of rollers 78 and bias the pair of rollers 78 in directions in which the pair of rollers 78 engage a cylindrical inner surface 80 of the clutch outer ring 73 and the corresponding cam surface 75.

A diametrically extending groove 81 is formed in the end surface of the clutch inner ring 74, while a transmission pin 82 is provided on the end surface of the rotor 42 and loosely inserted in the diametrically extending groove 81. A switch spring 83 is mounted between the clutch inner ring 74 and the retainer 76, and biases the torque transmission pin 82 to a neutral position where the torque transmission pin 82 is out of contact with the side walls of the diametrically extending groove 81.

While not depicted in the drawings, the switch spring 83 includes a ring portion 83a having two ends, and a pair of pressing pieces 83b extending radially outwardly from the respective two ends of the ring portion 83a. The ring portion 83a is fitted in a ring groove 84 formed in a back surface of the clutch inner ring 74, while the pair of pressing pieces 83b extend through a cutout 85 formed in the peripheral wall of the ring groove 84 and into a cutout 86 formed in the retainer 76, and bias both ends of the cutout 85, as well as both ends of the cutout 86, away from each other, thereby keeping the torque transmission pin 82 at the neutral position.

This reverse input blocking clutch 70 is used with the clutch outer ring 73 fixed, and configured such that when the rotor 42 of the electric motor 41 is rotated, and the retainer 76 rotates together with the rotor 42, the rear (in the rotational direction of the retainer 76) roller 78 in each pocket 77 of the retainer 76 is pushed by the rear (in the rotational direction of the retainer 76) end surface of the pocket 77, and disengages from the cylindrical inner surface 80 and the cam surface 75. When the retainer 76 further rotates thereafter, the torque transmission pin 82 abuts and presses one side surface of the diametrically extending groove 81, so that the rotation of the rotor 42 is now transmitted to the gear shaft 47a, and then to the input-side cam plate 51 of the rotation-linear motion conversion mechanism 50 through the pair of spur gears 47 and 48.

When the reverse input blocking clutch 70 engages in the above-described manner, the retainer 76 rotates relative to the clutch inner ring 74, so that the switch spring 83 is elastically deformed. Thus, when the electric motor 40 is deactivated thereafter, the retainer 76 and the torque transmission 82 return to the neutral position under the elastic restoring force of the switch spring 83, while the rollers 78 return to the engaged positions under the elastic force of the elastic members 79.

Thus, the rollers 78, which are in the engaged positions, block any reverse input applied from the release bearing 30, shown in FIG. 2, to the gear shaft 47a, i.e., prevent such reverse input from actuating the rotation-linear motion conversion mechanism 50, shown in FIG. 2.

This reverse input blocking clutch 70 can be used in an automatic clutch device in which, as shown in FIGS. 2 and 3, the electric motor 41 is arranged perpendicular to the input shaft 12. The reverse input blocking clutch 70 makes it possible to omit the shallow grooves 71 shown in FIG. 4A.

Figure 9B:
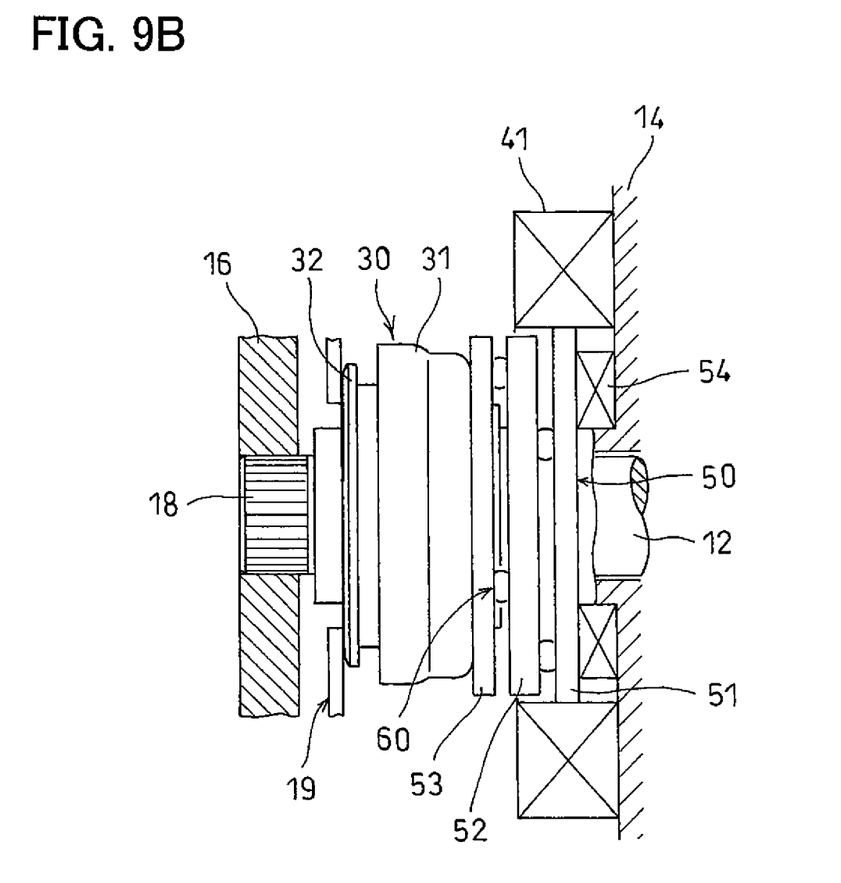
FIG. 9B is a sectional view of still another embodiment of an automatic clutch device according to the present invention.

While in FIGS. 3 and 9A, the rotor 42 of the electric motor 41 is a solid shaft, the electric motor 41 is not limited to this type. In FIG. 9B, the electric motor 41 is a hollow motor, i.e., a motor including a tubular rotor, not shown, and fitted to the input-side cam plate 51 while being supported by the clutch housing 14 such that the input-side cam plate 51 is directly rotated by the hollow motor 41.

By using a hollow motor 41, which can be fitted to the input-side cam plate 51, it is possible to further reduce the size of the automatic clutch device.

Figure 11:
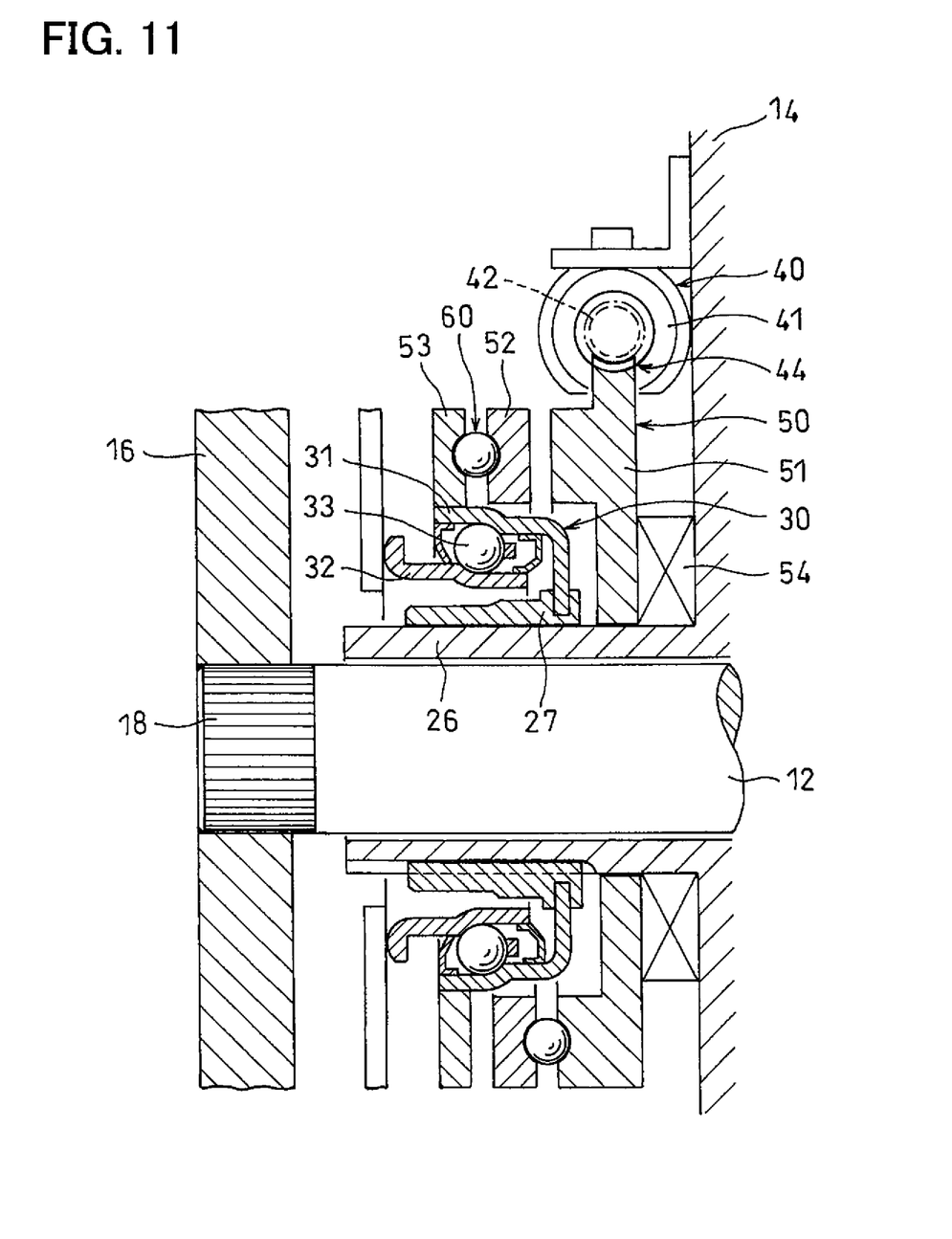
FIG. 11 is a sectional view of still another embodiment of an automatic clutch device according to the present invention.

In FIG. 2, the three cam plates 51-53 are provided between the release bearing 30 and the end plate of the clutch housing 14. In FIG. 11, the intermediate cam plate 52 and the output-side cam plate 53 are disposed outwardly of the outer race 31 of the release bearing 30, with the output-side cam plate 53 coupled to the outer race 31. In FIG. 11, the outer race 31 is coupled to the sleeve 27.

As shown in FIG. 11, by providing the intermediate cam plate 52 and the output-side cam plate 53 outwardly of the outer race 31 of the release bearing 30, it is possible to reduce the axial length of the automatic clutch device.

DESCRIPTION OF THE NUMERALS

10. Crankshaft
11. Transmission
12. Input shaft
13. Flywheel
16. Clutch disk
19. Diaphragm spring (pressure plate)
30. Release bearing
40. Axial force generating mechanism
41. Electric motor
42. Rotor
45. Worm
46. Worm wheel
47, 48. Spur gear
50. Rotation-linear motion conversion mechanism
51. Input-side cam plate
52. Intermediate cam plate
53. Output-side cam plate
60. Torque cam mechanism (ball cam; face cam)
61. Cam groove
62. Ball
63. Retainer
64. V-shaped cam groove
65. V-shaped cam protrusion
70. Reverse input blocking mechanism (Reverse input blocking clutch)
71. Shallow groove

What is claimed is:

1. An automatic clutch device comprising:
a flywheel attached to an end of a crankshaft of an engine;
a clutch disk provided at an end of an input shaft of a transmission, and opposed to the flywheel;
a pressure plate configured to bias the clutch disk toward the flywheel;
a release bearing configured to be movable toward and away from the pressure plate; and
an axial force generating mechanism configured to press and move the release bearing toward the pressure plate,
wherein the automatic clutch device is configured such that when the pressure plate is pressed by the release bearing, the flywheel and the clutch disk are uncoupled from each other,
wherein the axial force generating mechanism includes:
an electric motor having a rotor;
a rotation-linear motion conversion mechanism configured to convert rotation of the rotor of the electric motor to a linear motion of the release bearing, the rotation-linear motion conversion mechanism having a first end and a second end, and including at least two annular cam plates arranged in tandem with each other on the input shaft, and opposed to each other; and
a torque cam mechanism provided between the two opposed cam plates, and configured to convert relative rotation between the two opposed cam plates to a relative axial linear motion therebetween,
wherein a first one of the at least two cam plates most remote from the release bearing has at the first end an input-side cam plate configured to be driven by the electric motor, and a second one of the at least two cam plates has at the second end an output-side cam plate, and
wherein a reverse input blocking mechanism is mounted in a torque transmission path extending from the electric motor to the output-side cam plate, and configured to block reverse input from the release bearing.

2. The automatic clutch device of claim 1, wherein the torque cam mechanism comprises a plurality of ball cams each comprising an opposed pair of cam grooves which are each deepest at a circumferential center thereof and gradually shallows toward circumferential ends thereof, and a ball received between the opposed pair of cam grooves, the ball cams being circumferentially spaced apart from each other.

3. The automatic clutch device of claim 2, wherein a retainer is mounted between the two opposed cam plates, and retaining the balls of the ball cams.

4. The automatic clutch device of claim 3,
wherein the reverse input blocking mechanism includes pairs of shallow grooves, each of the shallow grooves having a constant depth over an entire circumferential length thereof, and each pair of the shallow grooves being provided, respectively, at a first circumferential end of a first one of a corresponding opposed pair of the cam grooves and at a second circumferential end, which is opposite from the first circumferential end, of a second one of the corresponding opposed pair of the cam grooves, and wherein the reverse input blocking mechanism is configured such that when the two opposed cam plates rotate relative to each other, each of the balls is fitted and trapped between a corresponding pair of the shallow grooves, thereby blocking reverse input.

5. The automatic clutch device of claim 2, wherein the reverse input blocking mechanism includes pairs of shallow grooves, each of the shallow grooves having a constant depth over an entire circumferential length thereof, and each pair of the shallow grooves being provided, respectively, at a first circumferential end of a first one of a corresponding opposed pair of the cam grooves and at a second circumferential end, which is opposite from the first circumferential end, of a second one of the corresponding opposed pair of the cam grooves, and wherein the reverse input blocking mechanism is configured such that when the two opposed cam plates rotate relative to each other, each of the balls is fitted and trapped between a corresponding pair of the shallow grooves, thereby blocking reverse input.

6. The automatic clutch device of claim 1, wherein the torque cam mechanism comprises face cams each comprising a V-shaped cam groove formed in a first one of the two opposed cam plates, and a V-shaped protrusion formed on a second one of the two opposed cam plates.

7. The automatic clutch device of claim 6, wherein the reverse input blocking mechanism comprises a reverse input blocking clutch configured to allow transmission of the rotation of the rotor of the motor to the input-side cam plate, and block reverse input from the input-side cam plate.

8. The automatic clutch device of claim 1, wherein the electric motor is arranged perpendicular to the input shaft, the rotor of the electric motor is a solid shaft, and the axial force generating mechanism further includes a worm and a worm wheel which are configured to transmit the rotation of the rotor of the electric motor to the input-side cam plate.

9. The automatic clutch device of claim 8, wherein the reverse input blocking mechanism comprises a reverse input blocking clutch configured to allow transmission of the rotation of the rotor of the motor to the input-side cam plate, and block reverse input from the input-side cam plate.

10. The automatic clutch device of claim 1, wherein the electric motor is arranged parallel to the input shaft, the rotor of the electric motor is a solid shaft, and the axial force generating mechanism further includes a pair of spur gears that mesh with each other and are configured to transmit the rotation of the rotor of the electric motor to the input-side cam plate.

11. The automatic clutch device of claim 10, wherein the reverse input blocking mechanism comprises a reverse input blocking clutch configured to allow transmission of the rotation of the rotor of the motor to the input-side cam plate, and block reverse input from the input-side cam plate.

12. The automatic clutch device of claim 1, wherein the electric motor is a hollow motor of which the rotor is a cylindrical rotor, and wherein the electric motor is fitted to the input-side cam plate such that rotation of the electric motor is directly transmitted to the input-side cam plate.

13. The automatic clutch device of claim 1, wherein the output-side cam plate is fixedly fitted on a radially outer surface of the release bearing.

\* \* \* \* \*